(12) United States Patent
Feuillard et al.

(10) Patent No.: US 6,622,588 B1
(45) Date of Patent: Sep. 23, 2003

(54) REMOTE CONTROL DEVICE BY CABLE FOR MOTOR VEHICLE EQUIPMENT

(75) Inventors: Vincent Feuillard, Le Mesnil Saint Denis (FR); Carine Paumier, Versailles (FR); Olivier Seuge, Swansea (GB)

(73) Assignee: Valeo Climatisation, La Verriere Cedex (FR)

(*) Notice: Subject to any disclaimer, the term of this patent is extended or adjusted under 35 U.S.C. 154(b) by 0 days.

(21) Appl. No.: 09/529,270

(22) PCT Filed: Jul. 28, 1999

(86) PCT No.: PCT/FR99/01860

§ 371 (c)(1),
(2), (4) Date: Apr. 10, 2000

(87) PCT Pub. No.: WO00/09897

PCT Pub. Date: Feb. 24, 2000

(30) Foreign Application Priority Data

Aug. 10, 1998 (FR) .............................. 98 10252

(51) Int. Cl.[7] .............................. F16C 1/10; B28B 5/00
(52) U.S. Cl. .................... 74/502.4; 74/502.6; 74/500.5; 74/501.5 R; 264/242; 264/251
(58) Field of Search ................. 74/501.5 R–502.6; 264/242, 251

(56) References Cited

U.S. PATENT DOCUMENTS

| | | | |
|---|---|---|---|
| 4,038,881 A | | 8/1977 | Conrad |
| 4,185,515 A | | 1/1980 | Webb |
| 4,304,149 A | * | 12/1981 | Heimann .................. 74/501 R |
| 4,541,303 A | * | 9/1985 | Kuzunishi .................. 74/501 R |
| 4,547,239 A | * | 10/1985 | Carlson ...................... 156/73.5 |
| 4,569,420 A | * | 2/1986 | Pickett et al. ............... 184/15.1 |
| 4,597,620 A | * | 7/1986 | Lindner et al. ........... 339/89 R |
| 5,079,967 A | * | 1/1992 | LaCava .................. 74/501.5 R |
| 5,085,594 A | * | 2/1992 | Kaelin ........................ 439/427 |
| 5,435,052 A | * | 7/1995 | Spease ...................... 29/527.4 |
| 5,653,147 A | * | 8/1997 | Kelley et al. ............... 74/502.4 |
| 5,862,710 A | * | 1/1999 | Koenig ...................... 74/502.4 |
| 5,868,038 A | * | 2/1999 | Bravo ........................ 74/502.4 |
| 5,884,531 A | * | 3/1999 | Koenig ...................... 74/502.4 |
| 6,040,384 A | * | 3/2000 | Reynolds et al. ........... 525/180 |
| 6,306,328 B1 | * | 10/2001 | Baffer et al. ................ 264/242 |

FOREIGN PATENT DOCUMENTS

| | | | |
|---|---|---|---|
| CH | 682837 | 1/1980 | |
| DE | 24 18 110 | 11/1974 | |
| EP | 492289 A1 | 7/1992 | |
| FR | 1522596 | 8/1968 | |
| JP | 58-91414 | * 5/1983 | ................ 74/502.4 |
| JP | 11-247078 | * 9/1999 | ............ 74/502.4 X |

* cited by examiner

*Primary Examiner*—Vinh T. Luong
(74) *Attorney, Agent, or Firm*—Morgan & Finnegan, LLP

(57) ABSTRACT

The invention concerns a remote control device for a motor vehicle comprising a cable (22) whereof the ends (26, 28) are each provided with a connecting piece (34, 36), a sleeve (24) wherein the cable can slide such that the cable ends (26, 28) exceed the sleeve ends (30, 32), and clips (42, 44) for interlocking the sleeve ends on parts of the vehicle. The connecting pieces (34, 36) and the clips (42, 44) are overmoulded on the cable and on the sleeve respectively from a common plastic material, thereby enabling to control accurately the distance (A or B) between the connecting piece and the clip.

15 Claims, 3 Drawing Sheets

REMOTE CONTROL DEVICE BY CABLE FOR MOTOR VEHICLE EQUIPMENT

BACKGROUND OF THE INVENTION

The invention relates to a remote control device by cable for motor vehicle equipment such as, for example, a heating and/or air conditioning unit of the passenger compartment of such a vehicle.

BRIEF SUMMARY OF THE INVENTION

The device of the invention is of the type comprising a cable, the ends of which are each provided with a connecting piece, a sleeve in which the cable can slide so that the ends of the cable project from the ends of the sleeve, as well as clips that are capable of attaching the ends of the sleeve onto parts of the vehicle.

In known devices of this type, one of the clips is generally fixed to a control panel provided on the dashboard of the vehicle, whereas the other clip is fixed to the actual equipment.

Normally, one of the ends of the cable is provided to be connected to the end of a pivoting lever that is operated by a control knob, whereas the other end of the cable is provided to be connected to the end of another lever which operates a mobile element of the equipment.

In the case of a heating and/or air conditioning unit of a motor vehicle, this latter lever most frequently serves to activate the rotational displacement of a pivoting flap which controls a flow of air.

Such control devices by cable raise in particular questions of control, given that it is necessary to be able to bring two limit of travel positions of the control device (generally a rotary knob) to correspond with two respective limit of travel positions of a movable element of the equipment of the vehicle.

In other words, it is necessary to adjust accurately the difference between the length of the cable (defined between its two ends), and the length of the sleeve (defined between its two ends or between its two clips). This difference in length is also called "functional projection".

The regulation of this difference in length is difficult to control given that the sleeve and the cable both have a dimensional tolerance. In fact, the tolerance of the sleeve may reach values of more or less 1 mm, even more or less 2 mm, whereas the cable itself has a dimension tolerance of more or less 1 mm. As a result the abovementioned difference, corresponding to the value of the functional projection, may have a tolerance of more or less 3 mm in relation to its nominal value.

Different solutions have already been proposed to try to resolve this problem.

One solution consists of regulating the "functional projection" directly on the-assembly line of the vehicle by placing a fastening clamp of the sleeve at one of the ends of said sleeve, generally on the side of the housing of the equipment. This solution requires access to an experienced operator, which complicates the mounting operations and also increases their cost.

The regulation of the dimension of the "functional projection" before assembly on the assembly line is also known. This regulation may be achieved, for example, by a screw regulating device situated in the middle of the remote control device, or by a device with a clamp fitting, as disclosed by document EP 0 492 289. There too, these solutions are long and expensive to implement.

Other solutions consist in using self-adjusting spring devices between the cables and the sleeve. These devices are expensive and do not ensure great reliability.

The object of the invention is in particular to overcome the above-mentioned drawbacks.

In particular, it aims to obtain a remote control device of the type defined above, which allows a precise regulation of the functional projection to be ensured before mounting on the vehicle.

For this purpose the invention proposes a remote control device of the type defined in the introduction, in which the connecting pieces and the clips are overmoulded respectively onto the cable and the sleeve from the same plastic material.

Thus, the two connecting pieces and the clips may be overmoulded in well-defined respective positions, which allows the "functional projection" to be adjusted each time with a slight tolerance.

The invention advantageously specifies that a connecting piece and an associated clip are overmoulded simultaneously with a precise control of the distance between the connecting piece and the clip.

In a preferred embodiment of the invention, the two connecting pieces are identical. The latter preferably each have a shape generated by revolution, in particular a substantially spherical shape, preferably in relation to the axis of the cable.

In this preferred embodiment of the invention, the two clips are identical.

Thus, when the two connecting pieces are identical and the two clips are also identical, the remote control offers a symmetry and it may therefore be installed in any manner, without it being advisable to choose a particular mounting direction.

In the case in which the two clips are identical, they may have a shape generated by revolution, in particular a substantially cylindrical shape, preferably in relation to the axis of the sleeve. Such a shape is essentially suitable for a radial connection of the clip onto a support forming part of the vehicle.

In another refinement, each clip comprises axial snapping means and radial snapping means for the connection of the clip at will, either onto a support with axial attachment, or onto a support with radial attachment.

In this particular case, it is advantageously specified that each clip comprises a split muff for the axial snapping, which depends on a ring for the radial snapping, the muff being situated on the side the end of the sleeve.

This split muff advantageously comprises axial slots which between them delimit axial lugs equipped with respective hooks capable of bending radially.

In another embodiment of the invention, the two clips are different.

Thus, one of the clips may comprise a ring capable of being snapped radially into a receiver block of the vehicle, whereas the other clip may comprise a ring equipped with a snapping member capable of being received in another receiver block of the vehicle.

In the different embodiments of the invention, the connecting pieces and the clips are preferably made of a thermoplastic material, which is advantageously filled.

It may involve, for example, a material of the polyoxymethylene (POM) type, or of the polypropylene type, filled with talc.

From another angle, the invention relates to a process for manufacturing a remote control device such as that previously defined, which comprises the following operations:

a) providing for a sleeve in which a cable is threaded in such a manner that the ends of the cable project beyond the ends of the sleeve; and b) overmoulding, from the same plastic material, two connecting pieces respectively onto the two ends of the cable and two clips respectively onto the two ends of the sleeve.

In operation b), it is advantageously specified that a connecting piece and an associated clip are simultaneously overmoulded with a precise control of the distance between the connecting piece and the clip.

Thus, it may be specified that operation b) firstly comprises the simultaneous overmoulding of a connecting piece and of an associated clip, then the simultaneous overmoulding of another connecting piece and an associated clip.

BRIEF DESCRIPTION OF THE DRAWINGS

In the following description, given only by way of example, reference is made to the attached drawings, on which.

DETAILED DESCRIPTION OF THE INVENTION

Figure 1:
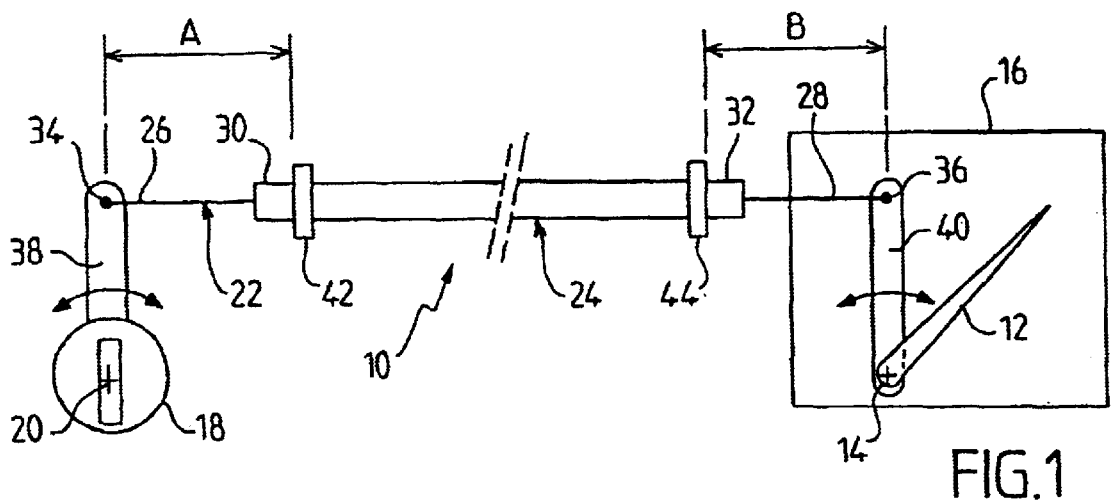
FIG. 1 is a diagrammatical representation of a device according to the invention applied to the control of a rotary flap that forms part of a heating and/or air conditioning unit for a motor vehicle, from a rotary knob.
Figure 2:
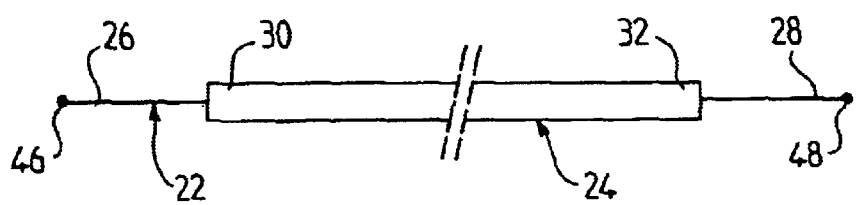
FIG. 2 diagrammatically represents the control device itself (cable and sleeve) with overmoulding of the connecting pieces and clips.
Figure 3:
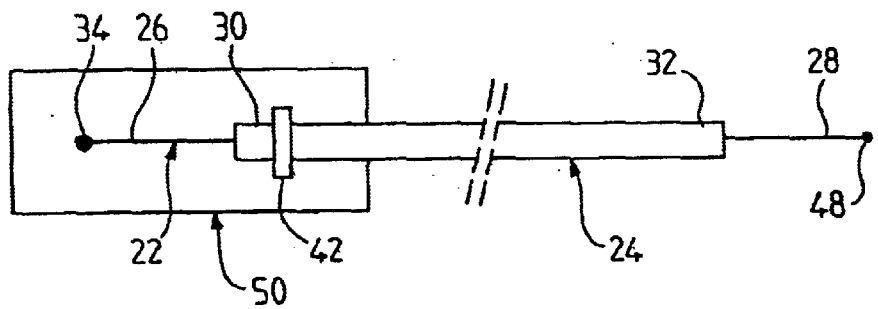
FIGS. 3 to 5 diagrammatically illustrate the control device of FIG. 2 during different overmoulding operations.
Figure 4:
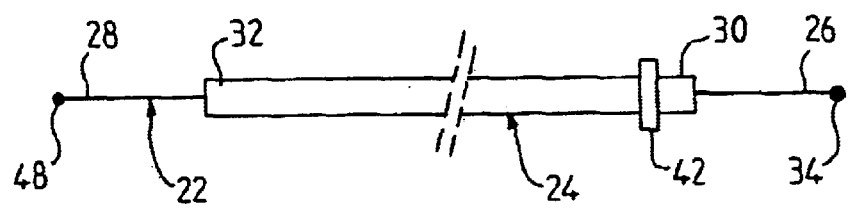

Reference is firstly made to FIG. 1, which represents a device 10 provided for the remote control of a flap 12 pivoted around an axis 14 and forming part of a heating and/or air conditioning unit 16 of the passenger compartment of a motor vehicle. The control of the flap is performed from a knob 18 mounted to rotate around an axis 20.

The device 10 comprises a deformable cable 22, advantageously made of steel, which slides inside a supple sleeve 24. The cable 22 comprises two ends 26 and 28 which project from respective ends 30 and 32 of the sleeve 24. The ends 26 and 28 are equipped with respective connecting pieces 34 and 36.

The connecting piece 34 is provided to be connected to the end of a lever 38 which is fixed in rotation with the knob 20, whereas the connecting piece 36 is provided to be connected to the end of a lever 40 pivoting around the axis 14 and fixed in rotation with the flap 12.

Thus, the operation of the rotary knob 18 in one direction or in the other provokes the rotational displacement of the flap 12. The latter serves to control the passage of a flow of air in the housing of the unit 16.

The overmoulding of the connecting pieces 34 and 36 and of the clips 42 and 44 is performed in precise conditions, so that the distance A that separates the connecting piece 34 from the end 30 of the sleeve (here defined by the position of the clip 42) and so that the distance B that separates the connecting piece 36 from the end 32 of the sleeve 24 (here defined by the position of the clip 44) are made with a minimum tolerance.

The sum A+B corresponds to the value D of the "functional projection" of the control device 10. Reference is now made to FIGS. 2 to 5 to describe the positioning of the connecting pieces 34 and 36 and of the clips 42 and 44 by overmoulding.

At the outset one provides for (FIG. 2) a remote control comprising the sleeve 24 in which the cable 22 is threaded so that the ends 26 and 28 of the cable project respectively beyond ends 30 and 32 of the sleeve. The ends 26 and 28 of the cable are ended respectively with two protuberances 46 and 48 intended to facilitate the subsequent overmoulding of the connecting pieces 34 and 36.

In a subsequent operation (FIG. 3) one proceeds with the simultaneous overmoulding of the connecting piece 34 around the protuberance 46 and of the clip 42 around the end 30 of the sleeve. This overmoulding is performed simultaneously during a single operation by means of a mould 50 represented diagrammatically. This mould allows the overmoulding of the connecting piece 34 and of the clip 42 with a precise positioning relative to said connecting piece and clip. This enables a distance A to be defined with a minimum tolerance. After unmoulding, the device is returned to be placed in the position of FIG. 4.

Then the end 28 of the cable and the end 32 of the sleeve are placed in the same mould 50, which allows the overmoulding of the connecting piece 36 and of the clip 44 to be performed during a single operation. There too is produced a precise mutual positioning of the connecting piece and of the clip, which allows a distance B between them to be obtained with a minimum tolerance.

Figure 5:
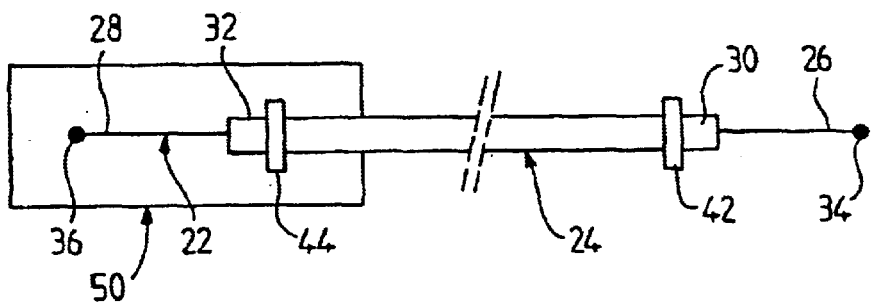

Thus, at the end of the operation represented on FIG. 5, a remote control 10 similar to that represented on FIG. 1 is obtained, in which the functional protuberance D (i.e. A+B) has a minimum tolerance.

In the above process, the same thermoplastic material is advantageously used for the overmoulding of the two connecting pieces and of the two clips. A thermoplastic material of the filled type is preferably used. By way of example, a polyoxymethylene type or polypropylene type material, filled by talc, for example containing 20% by weight talc, can be used.

In a preferred embodiment of the invention, the connecting pieces 34 and 36 are identical and have a shape generated by revolution, advantageously a substantially spherical shape, in relation to the axis of the cable.

Figure 6:
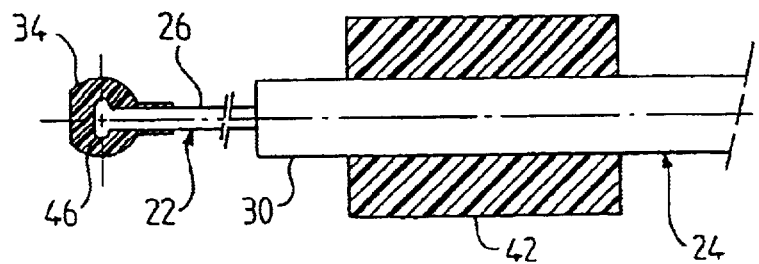
FIG. 6 is a longitudinal sectional view of the end of a control device according to the invention, in a first embodiment of the invention.

FIG. 6 shows the connecting piece 34 overmoulded around the protuberance 46 of the cable 12.

The clips 42 and 44 are also advantageously identical. These two clips preferably have a shape generated by revolution, in particular a substantially cylindrical shape, relative to the axis of the sleeve.

Thus, when the connecting pieces are identical and the clips 42 are identical, the device is symmetrical.

FIG. 6 shows the cylindrical structure of the clip 42 which is associated with the connecting piece 34. A clip 42 produced in this manner is more particularly suitable for radial mounting on an appropriate support of the vehicle, as will be seen further on.

Figure 7:
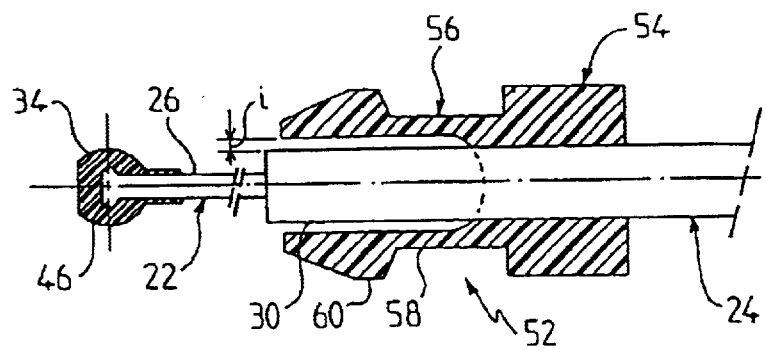
FIG. 7 is a similar view to FIG. 6, in a second embodiment of the invention.

Reference is now made to the embodiment of FIG. 7, in which the connecting pieces 34 and 36 are identical to one another and identical to the embodiment of FIG. 6, and in which the device comprises two identical clips 52, only one of which is represented, i.e. that provided at the end 30 of the sleeve. This clip 52 comprises a ring 54 having a cylindrical general shape overmoulded tightly around the sleeve, and a split muff 56 which is formed in a single piece with the ring 54 and which is situated on the side of the end of the sleeve.

The muff 56 comprises a plurality of axial slots which between them delimit axial lugs 58 ending in respective hooks 60 and capable of radially bending. The hooks 60 are turned outwardly and are provided to allow an axial snapping of the clip 52, whereas the ring 54 is provided to allow a radial snapping. Thus a same clip 52 may be used as desired in an axial type mounting or in a radial type mounting, as will be seen further on.

As can be seen on FIG. 7, the lugs 58 provide, in their position of rest, a gap i between them and the sleeve to allow the radial flexion of the hooks.

Figure 8:
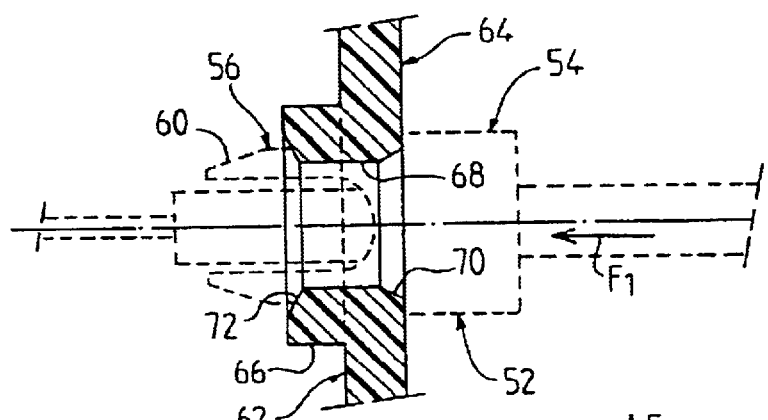
FIG. 8 diagrammatically shows the axial connection of the device of FIG. 7 with a support forming part of a motor vehicle.

Reference is now made to FIG. 8 which shows the axial snapping of the clip 52 onto a support 62 with axial attachment. The support 12 forms part of a control panel 64 comprising, for example, a rotary knob 18 similar to that of FIG. 1. The support 62 comprises an annular ring 66 through which the clip 62 is intended to pass, through which itself the sleeve and the cable pass. The ring 66 delimits an axial passage 68 having a circular cylindrical shape opening respectively into an inlet cone 70 and an outlet cone 72. The inlet cone 70 facilitates the introduction of the clip 52 in the axial direction of the arrow F1, which allows an inward radial deformation of the hook-shaped lugs 58. After complete introduction, the clip 52 occupies the position represented by broken lines on FIG. 8, in which the hooks 60 are radially outwardly moved apart and rest against the outlet cone 72, whereas the ring 54 rests on the other side next to the inlet cone 70.

The clip 52 and the support 64 have paired shapes which allow a precise axial retention of the clip in the support.

Figure 9:
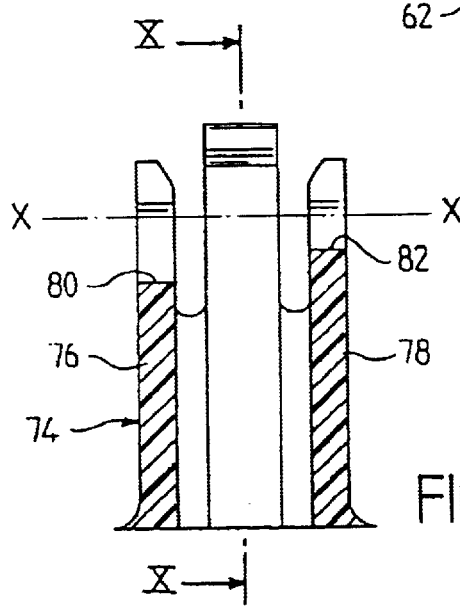
FIG. 9 is a longitudinal sectional view of a support for the radial mounting of the device of FIG. 7.
Figure 10:
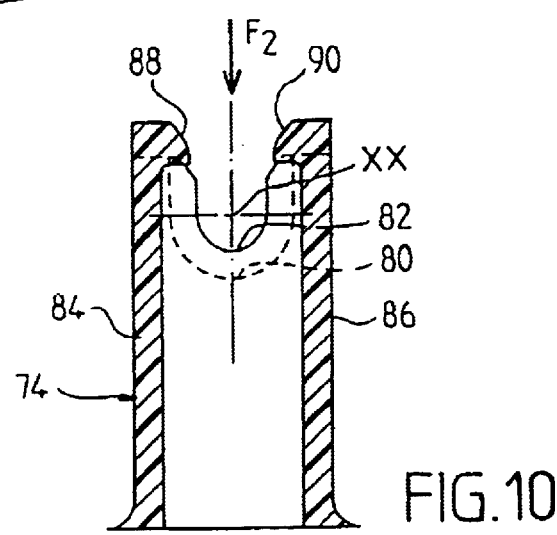
FIG. 10 is a sectional view along line X—X of FIG. 9.

Reference is now made to FIGS. 9 and 10 which represent another support 74 intended for the attachment of the other clip, which is identical to the clip 52 of FIG. 7. The support 74 is provided, in the example, to form part of the heating and/or air conditioning unit 16. The support 74 essentially comprises a block of parallelepipedic shape having two opposite walls that respectively delimit two U-shaped receptacles 80 and 82, these two receptacles being aligned along an axis XX, the receptacle 80 having larger dimensions than receptacle 82.

Provided between the walls 76 and 78 are two opposite deformable lugs 84 and 86 ending respectively in two hooks 88 and 90 that are turned towards one another. The support 74 allows a radial attachment of the clip 52 in the direction of arrow F2. During the introduction, the hooks 88 and 90 move apart from one another and then move closer to one another again once the clip 52 is immobilised in the support 74.

Figure 11:
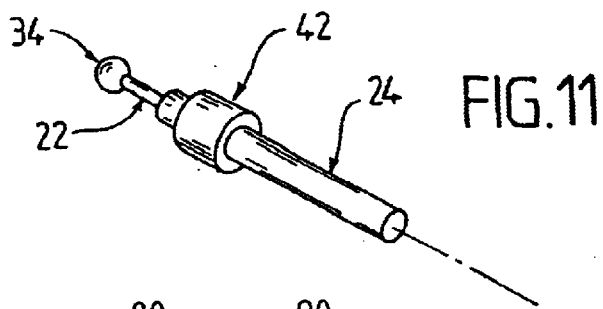
FIG. 11 is a perspective view of the end of a remote control device according to the invention.

Reference is now made to FIG. 11, which is a perspective view corresponding to FIG. 6. The clip 42, which has a circular cylindrical shape, is able to be received in the support 74 of FIGS. 9 and 10, which is also represented in perspective in FIG. 12.

Figures 12, 13:
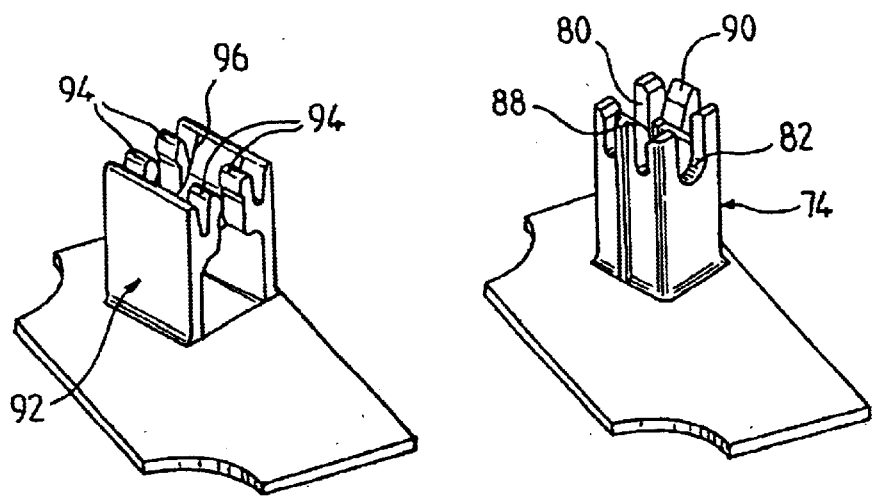
FIG. 12 is a perspective view of a receiver block capable of allowing the radial connection of the clip of FIG. 11.
FIG. 13 is a perspective view of another receiver block in a refinement.

The clip 42 may also be received in a support 92 such as that represented in FIG. 13, which comprises two pairs of elastic lugs 94 spaced axially from one another and capable of keeping the sleeve on either side of the clip 42, said clip being received in a recess 96, having a paired shape, delimited between the pairs of lugs 94.

Figure 14:
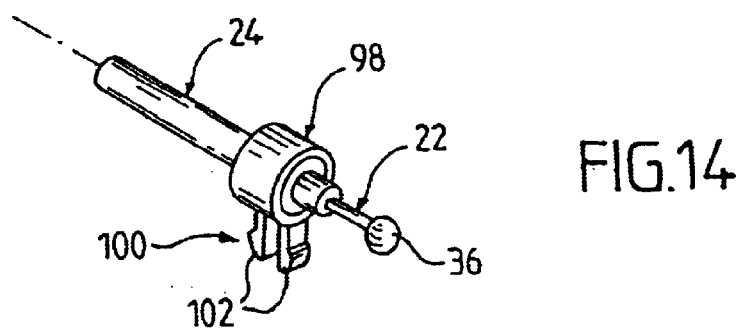
FIG. 14 shows a perspective view of the other end of the remote control device of FIG. 11.

Reference is now made to FIG. 14, which shows another clip 98, having a cylindrical general shape. It is made in a single piece with a snapping member 100 extending in the radial direction. The latter is formed of two hooks 102 that are spaced from one another and turned in opposite directions.

Figure 15:
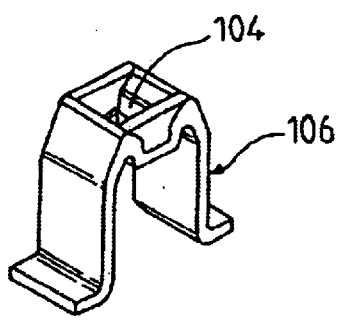
FIG. 15 is a perspective view of a receiver block capable of permitting the radial connection of the clip of FIG. 14.

This member 100 is capable of being received in a recess 104 having a paired shape which a support 106 has (FIG. 15), capable of being fixed to the housing of the unit 16. Thus, the clips (FIG. 11) and 98 (FIG. 14) are different and are capable of bending radially in respective supports by different means.

Of course, the invention is not limited to the embodiments that were previously described by way of example and it extends to other variants.

In particular, the device may be used for controlling other equipment of motor vehicles.

What is claimed is:

1. A remote control device for motor vehicle equipment, of the type comprising:
   a cable the ends of which are each provided with a connecting piece;
   a sleeve in which the cable can slide such that the ends of the cable project beyond the ends of the sleeve; and also clips, characterized in that the connecting pieces and the clips are respectively molded onto the cable and onto the sleeve from the same plastic material, wherein at least two of the clips are identical and each clip comprises axial snapping means and radial snapping means for the connection of the clip at will, either onto a support with axial attachment or onto a support with radial attachment.

2. A device according to claim 1, wherein the connecting piece and an associated clip are simultaneously molded with a precise regulation of the distance between the connecting piece and the clip.

3. A device according to claim 1, wherein the connecting pieces are identical.

4. A device according to claim 1, wherein the connecting pieces each have a substantially spherical shape generated by revolution.

5. A device according to claim 1, wherein at least two of the clips have a substantially cylindrical shape generated by revolution.

6. A device according to claim 1, wherein the at least two clips each include a split muff for axial snapping, wherein the muff is situated on the side of the end of the sleeve.

7. A device according to claim 6, wherein the split muff comprises axial slots delimiting between them axial lugs equipped with respective hooks capable of bending radially.

8. A device according to claim 6, further including a ring for radial snapping.

9. A device according to claim 1, wherein at least two of the clips are different.

10. A device according to claim 9, wherein one of the at least two clips comprises a ring operable to be snapped radially into a receiver block, whereas another clip of the at least two clips comprises another ring equipped with a snapping member operable to be received in another receiver block.

11. A device according to claim 1 wherein the connecting pieces and the clips are made of thermoplastic material.

12. A device according to claim 11, wherein the connecting pieces and the clips are made from polyoxymethylene or polypropylene and are filled with talc.

13. A process for the manufacture of a remote controlled device for motor vehicle equipment including a cable with cable ends, each end being provided with a connecting piece, a sleeve in which the cable can slide, the sleeve having sleeve ends, and wherein the cable ends project beyond the sleeve ends, and a plurality of clips wherein the connecting pieces are molded onto the cable and the clips are molded onto the sleeve, wherein corresponding connecting pieces and respective clips are molded during a respective single operation from a single mold, comprising:

providing for a sleeve in which the cable is threaded in such a manner that the ends of the cable project beyond ends of the sleeve; and molding two connecting pieces respectively onto the two ends of the cable and two clips respectively on the two ends of the sleeve.

14. A process according to claim 13, wherein the molding includes a connecting piece and an associated clip are molded simultaneously with a precise control of the distance between the connecting piece and the associated clip.

15. A process according to claim 13 wherein the molding includes the simultaneous molding of a connecting piece and of an associated clip, then the simultaneous molding of another connecting piece and of another associated clip.

* * * * *